UNITED STATES PATENT OFFICE.

EDWARD M. WALSH AND SYDNEY B. WALSH, OF JANVIER, NEW JERSEY.

METHOD OF MAKING LARGE ARTICLES FROM PIECES OF AVENTURIN.

SPECIFICATION forming part of Letters Patent No. 629,973, dated August 1, 1899.

Application filed December 4, 1897. Serial No. 660,773. (Specimens.)

*To all whom it may concern:*

Be it known that we, EDWARD M. WALSH and SYDNEY B. WALSH, citizens of the United States, and residents of Janvier, Gloucester county, New Jersey, have invented certain new and useful Improvements in Methods of Making Large Articles from Pieces of Aventurin, of which the following is a specification.

Our invention relates to the manufacture of large articles—as slabs, bricks, tiles, pillars, plaques, &c.—from aventurin.

Aventurin, commonly called "gold-stone," is a glass of an opaque golden-brown color filled with specks or spangles of a bright gold-color. It is made by mixing with the batch of sand and soda usually used in glass-making copper or brass filings, which are melted together in a crucible and cooled. During the cooling the melted mass contracts and breaks into a number of small pieces, and hence aventurin has heretofore been confined in its use to comparatively small ornamental objects or to articles of jewelry. It has been impossible heretofore to obtain it in pieces of any considerable size.

In carrying out our invention we take a mold of any suitable material and of approximately the size of the article desired and place in it the small pieces of aventurin, or, if other colors of glass are desired in addition to the aventurin in the article to be cast, with pieces of glass of the other desired colors. The mold is now placed in a muffle, kiln, oven, or lear, and, either or both the mold or oven being luted to prevent access of outside air, the mass within the mold is melted, the several small pieces of the aventurin running together and forming one compact mass, which is gradually cooled off and annealed and finally cut and polished in the usual manner. No effort is made to conduct the process *in vacuo;* but outside air should be excluded during the process of melting.

The molds in which the pieces of aventurin, or aventurin and other glass, are melted may be made of any suitable refractory material, and the oven or muffle in which this mold is placed in order to melt the glass may be of any suitable form. During the melting great care must be taken to exclude all air or oxygen. If this is not done, the spangles which give the aventurin its beauty and value will oxidize and the material will be valueless.

Having thus described our invention, we claim as new, and desire to secure by Letters Patent—

The method of making large pieces of aventurin which consists in welding and melting small pieces of the material in a mold within a furnace, muffle, oven or lear from which air or oxygen is excluded.

EDWARD M. WALSH.
SYDNEY B. WALSH.

Witnesses:
LAWRENCE MARSH,
H. L. DUNN.